(12) United States Patent
Arad et al.

(10) Patent No.: US 8,897,315 B1
(45) Date of Patent: Nov. 25, 2014

(54) FABRIC TRAFFIC MANAGEMENT IN A NETWORK DEVICE

(71) Applicant: Marvell Israel (M.I.S.L) Ltd., Yokneam (IL)

(72) Inventors: Carmi Arad, Nofit (IL); Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 139 days.

(21) Appl. No.: 13/735,719

(22) Filed: Jan. 7, 2013

Related U.S. Application Data

(60) Provisional application No. 61/584,184, filed on Jan. 6, 2012.

(51) Int. Cl.
*H04L 12/54* (2013.01)
*H04L 12/947* (2013.01)

(52) U.S. Cl.
CPC .................................... *H04L 49/252* (2013.01)
USPC ........................................................ 370/428

(58) Field of Classification Search
CPC ... H04L 12/54; H04L 49/252; H04L 2012/54; H04L 49/90; H04L 2012/5681; H04L 29/0653; H04L 29/06095
USPC ......... 370/428, 359, 429, 248, 392, 389, 386, 370/474, 412, 395.3, 463, 419, 423, 395.31, 370/413
See application file for complete search history.

(56) References Cited

U.S. PATENT DOCUMENTS

| | | | |
|---|---|---|---|
| 6,807,179 | B1 | 10/2004 | Kanuri et al. |
| 7,636,319 | B2 | 12/2009 | Shankar et al. |
| 7,991,926 | B1 | 8/2011 | Arad |
| 2007/0168531 | A1 | 7/2007 | Sitaraman et al. |
| 2008/0037531 | A1 | 2/2008 | Donoghue et al. |
| 2008/0315985 | A1 | 12/2008 | Johnsen et al. |
| 2010/0142398 | A1 | 6/2010 | Arad et al. |
| 2011/0007741 | A1 | 1/2011 | Kreeger et al. |
| 2011/0164616 | A1 | 7/2011 | Kloth et al. |

*Primary Examiner* — Chi Pham
*Assistant Examiner* — Alexander O Boakye

(57) ABSTRACT

A network switch device includes a plurality of ingress processors, each ingress processor has a packet memory to store packets received via a plurality of ingress ports. A plurality of egress processors are coupled to the plurality of ingress processors via a switch fabric. Each egress processor has a plurality of egress ports. Each ingress processor is configured to create descriptors for packets received via ingress ports, each descriptor having a smaller size than the corresponding packet, store the packets in the packet memory, process each descriptor to determine at least the appropriate egress processor among the egress processors to which to forward the descriptor, transmit, via the switch fabric, descriptors to egress processors, and, in response to receiving PULL messages from the egress processors, transmit packets to the egress processors via the switch fabric.

20 Claims, 5 Drawing Sheets

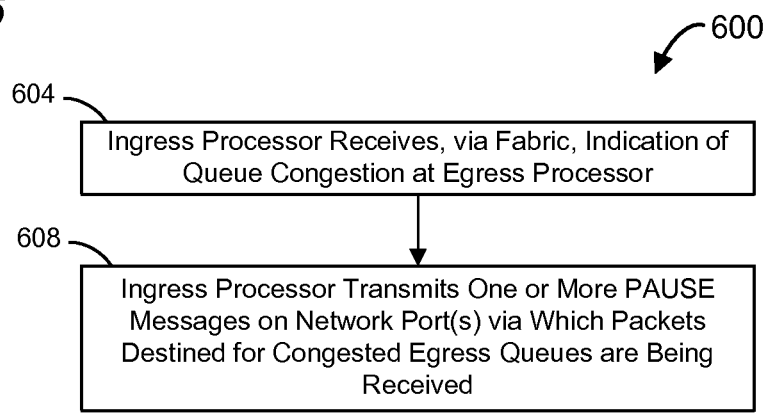
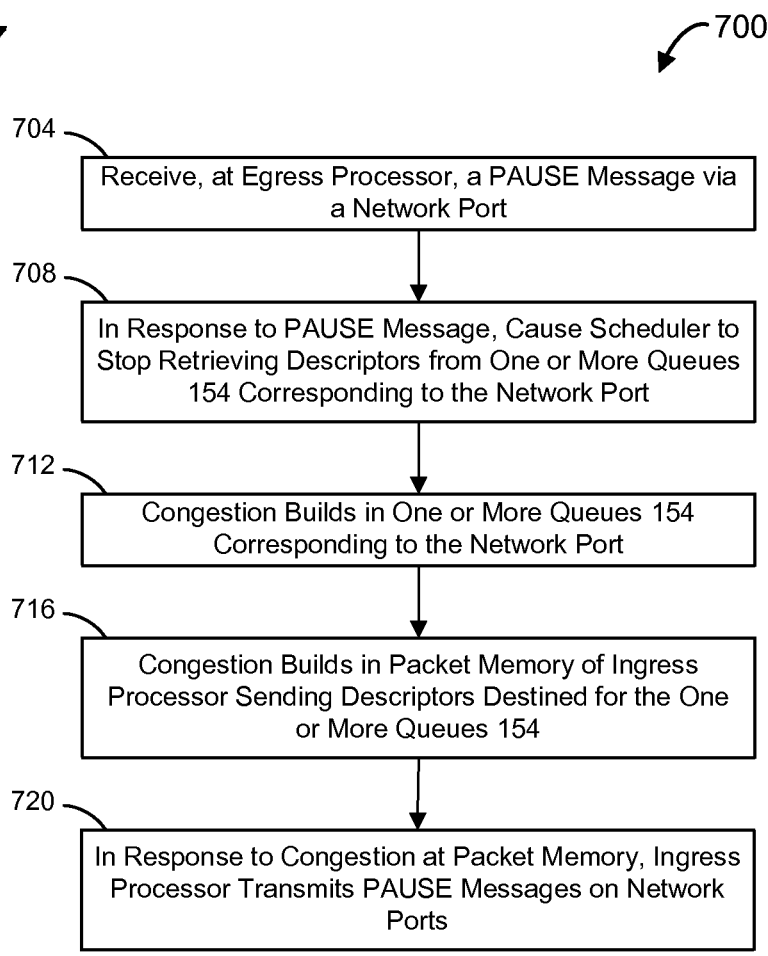

FABRIC TRAFFIC MANAGEMENT IN A NETWORK DEVICE

CROSS-REFERENCES TO RELATED APPLICATIONS

This disclosure claims the benefit of U.S. Provisional Patent Application No. 61/584,184, entitled "Fabric Traffic Management," filed on Jan. 6, 2012, the disclosure of which is incorporated herein by reference.

FIELD OF THE DISCLOSURE

The present disclosure relates generally to network switch devices and, more particularly, to network switch devices employing a fabric to interconnect a plurality of packet processors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network switch devices comprise a plurality of packet processors interconnected by a fabric, such as a fabric comprising one or more crossbar devices. The packet processors each include a plurality of ports (network ports) coupled to a plurality of network links, and one or more ports (fabric ports) coupled to the fabric. In such devices, a packet is received via a first network port of a first packet processor, and the first packet processor analyzes the packet to determine via which other network port (e.g., a second network port) the packet is to be transmitted. When the second network port is a port of another one of the packet processors (e.g., a second packet processor), the first packet processor provides the packet to the fabric over a first group of one or more fabric ports, and the fabric, in turn, provides the packet to the second packet processor over a second group of one or more fabric ports. The second packet processor then transmits the packet via the second network port.

In one known approach, the packet is initially stored in an ingress queue of the first packet processor. A scheduler of the first packet processor determines when the packet can be provided to the crossbar. A scheduler of the crossbar then determines when the packet can be provided to the second packet processor. At the second packet processor, the packet is stored in a transmit queue. A scheduler of the second packet processor then determines when the packet can be transmitted via the second port of the second packet processor.

SUMMARY

In one embodiment, a network switch device comprises a plurality of ingress processors, each ingress processor having (i) a plurality of ingress ports, and (ii) a packet memory to store packets received via the plurality of ingress ports. The network switch device also comprises a plurality of egress processors, each egress processor having a plurality of egress ports, and a switch fabric configured to communicatively couple the plurality of ingress processors to the plurality of egress processors. Each ingress processor is configured to create descriptors for packets received via ingress ports, each descriptor having a smaller size than the corresponding packet, store the packets in the packet memory, process each descriptor to determine at least the appropriate egress processor among the egress processors to which to forward the descriptor, transmit, via the switch fabric, descriptors to egress processors, and, in response to receiving PULL messages from the egress processors, transmit packets to the egress processors via the switch fabric.

In another embodiment, a method is implemented in a network switch device having a plurality of ingress processors communicatively coupled to a plurality of egress processors via a switch fabric. The method includes receiving packets via ingress ports of the ingress processors, and storing packets received via ingress ports of the ingress processors in memories of the ingress processors. The method also includes creating descriptors for packets received via ingress ports of the ingress processors, each descriptor being having a smaller size than the corresponding packet, and processing, at the ingress processors, the descriptors to at least determine for each descriptor an appropriate egress processor among the plurality of egress processors to which to transmit the descriptor. Additionally, the method includes transmitting, via the switch fabric, descriptors from ingress processors to egress processors, and responsive to PULL messages received from egress processors, transmitting, via the switch fabric, packets corresponding to the PULL messages from ingress processors to the egress processors.

In yet another embodiment, a network switch device comprises an ingress processor having (i) a plurality of ingress ports, and (ii) a packet memory to store packets received via the plurality of ingress ports. The network switch device also comprises an egress processor having (i) a plurality of egress ports, and a switch fabric configured to communicatively couple the ingress processor to the egress processor. The ingress processor is configured to create descriptors for packets received via ingress ports, each descriptor having a smaller size than the corresponding packet, process the descriptors while the packets are stored in a memory associated with the ingress processor, and, in response to receiving PULL messages from the egress processor, retrieve corresponding packets from the memory and transmit the retrieved packets to the egress processors via the switch fabric.

In still another embodiment, a method is for managing internal traffic in switch having ingress processors and egress processors, the ingress and egress processors coupled by a switch fabric. The method includes receiving packets via ingress ports of an ingress processor, and storing packets received via ingress ports of the ingress processor in a memory of the ingress processor. Additionally, the method includes creating descriptors for packets received via ingress ports of the ingress processor, each descriptor being having a smaller size than the corresponding packet, and processing, at the ingress processor, the descriptors while corresponding received packets are stored in the memory. The method also includes transmitting, via a switch fabric, packets from the ingress processor to an egress processor in response to PULL messages received from the egress processor.

In a further embodiment, a network switch device comprises a plurality of ingress processors, each ingress processor having a plurality of ingress ports, and a plurality of egress processors, each egress processor having (i) a plurality of egress ports, and (ii) a plurality of egress queues corresponding to the plurality of egress ports. The network switch device also comprises a switch fabric to communicatively couple the plurality of ingress processors to the plurality of egress processors. Each egress processor is configured to receive, from ingress processors, descriptors corresponding to packets received by the ingress processors via the switch fabric, each descriptor being having a smaller size than the corresponding packet, save descriptors in queues corresponding to egress ports via which packets corresponding to the descriptors are to be transmitted, perform an egress processing operation on descriptors stored in the queues, send, to ingress processors via the switch fabric, PULL messages corresponding descriptors stored in the queues, the PULL messages to prompt the ingress processors to transmit, via the switch fabric, corresponding packets, receive, via the switch fabric, packets from ingress processors responsive to the PULL messages, and transmit, via egress ports, packets received from ingress processors via the switch fabric.

In yet another embodiment, a method is implemented in a network switch device, the network switch device including a plurality of ingress processors communicatively coupled to a plurality of egress processors via a switch fabric. The method includes receiving, at egress processors, descriptors from ingress processors via the switch fabric, the descriptors corresponding to packets received by the ingress processors, each descriptor being having a smaller size than the corresponding packet. The method additionally includes transmitting, via the switch fabric, PULL messages from egress processors to ingress processors in response to descriptors, the PULL messages prompting ingress processors to transmit packets stored in memories of ingress processors. The method also includes receiving, at egress processors, packets from ingress processors, the packets being transmitted in response to PULL messages. The method further includes transmitting, via egress ports of egress processors, packets received from ingress processors via the switch fabric.

BRIEF DESCRIPTION OF THE DRAWINGS

FIG. 6 is a flow diagram of another example method for managing internal traffic in a network switch in conjunction with a lossless service, according to another embodiment.

FIG. 7 is a flow diagram of another example method for managing internal traffic in a network switch in conjunction with a lossless service, according to another embodiment.

DETAILED DESCRIPTION

Figure 1:
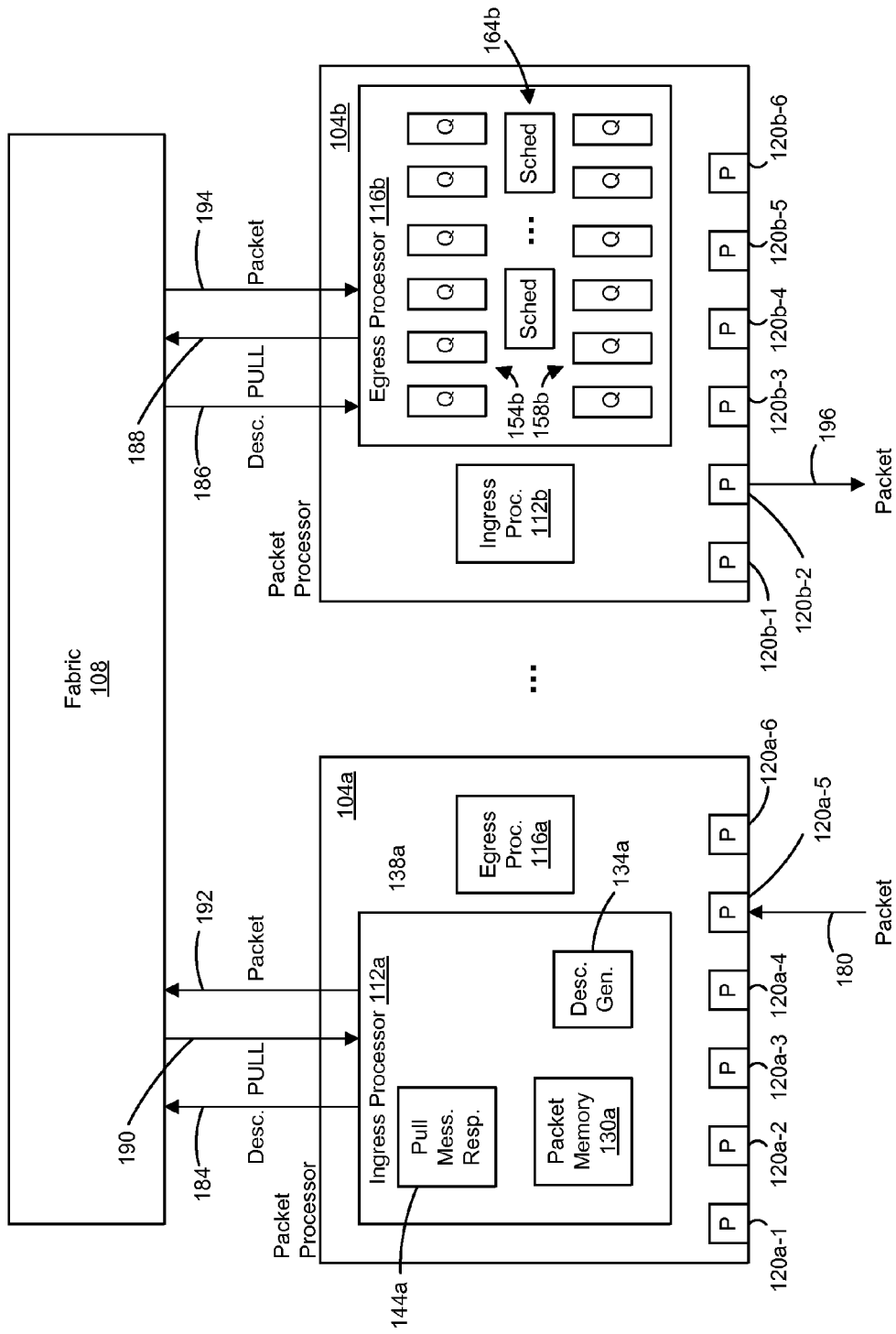
FIG. 1 is a block diagram of an example network switch device, according to an embodiment.

FIG. 1 is a block diagram of an example network switch device 100, according to an embodiment. The network switch device 100 comprises a plurality of packet processors 104 interconnected by a fabric device 108. Although two packet processors are illustrated in FIG. 1, the network switch device 100 comprises any suitable number of packet processors 104 (e.g., from one packet processor 104 to several hundred packet processors 104, in some embodiments. In other embodiments, the network switch device 100 comprises other suitable numbers of packet processors 104. In one embodiment, the fabric device 108 comprises one or more crossbar devices. Each packet processor 104 includes one or more fabric ports coupled to the fabric 108, in an embodiment.

Each packet processor 104 provides a packet to the fabric 108 via a set of one or more fabric ports, and the fabric 108 provides packets to the packet processors 104 via respective sets of one or more fabric ports, in an embodiment.

Each packet processor 104 includes an ingress processor 112 and an egress processor 116, in an embodiment. Each ingress processor 112 is configured to process an ingressing packet (e.g., a packet ingressing the network switch device 100) to determine via which packet processor 104 and/or which port of the packet processor 104 the packet should be transmitted. As will be described in more detail below, the ingress processor 112 provides the packet to the fabric 108 in response to a prompt (e.g., a PULL message) from the packet processor 104 that is to transmit the packet. The fabric 108, in turn, provides the packet to the packet processor 104 that is to transmit the packet via one of its ports.

Each egress processor 116 is configured to process a packet received from an ingress processor 112, and to transmit the packet via a port 120. Additionally, the egress processor 116 is configured to prompt the ingress processor 112 to provide the packet via the fabric 108. For example, as will be described in more detail below, the egress processor 116 is configured to generate a PULL message and provide the PULL message to the fabric 108. The fabric 108, in turn, provides the PULL message to the ingress processor 112 to prompt the ingress processor 112 to provide the packet to the fabric 108.

Example structures of the packet processors 104, according to an embodiment, will now be described in more detail. As discussed above, each packet processor comprises an ingress processor 112 and an egress processor 116. Additionally, each packet processor comprises a plurality of ports 120. Although six ports are illustrated in FIG. 1, other suitable numbers of ports are utilized in other embodiments. In one specific example, each packet processor 104 includes 48 ports 120, according to an embodiment.

Each ingress processor 112 includes or is coupled to a memory 130, and the ingress processor 112 is configured to store packets received via the ports 120 in the memory 130. Additionally, each ingress processor 112 includes a descriptor generator 134 that is configured to generate a descriptor for each packet received via the ports 120. The descriptor is smaller than the packet to which it corresponds. In an embodiment, the descriptor suitably includes fields from a header of the packet. The descriptor also includes an identifier of the packet to which the descriptor corresponds, in an embodiment. The identifier of the packet serves as a pointer to, or as some other suitable indicator of, a location in the memory 130 at which the packet is stored, the memory 130 being associated with the ingress processor 104 at which the packet is received, in some embodiments.

The ingress processor 112 is configured to perform ingress processing of the descriptor. In an embodiment, ingress processing includes determining a target port via which the packet corresponding to the descriptor is to be transmitted and/or a target packet processor 104 that is to transmit the packet. In an embodiment, the ingress processor 112 includes a forwarding engine (not shown) configured to determine the target port and/or target packet processor 104. The forwarding engine 138 is configured to determine the target port and/or target packet processor 104 at least by analyzing one or more fields of the descriptor, including one or more of an address (e.g., a destination media access control (MAC) address, an Internet Protocol (IP) address, etc.), a virtual local area network (VLAN) identifier, etc. For example, the forwarding engine includes or is coupled to a forwarding database, in an embodiment, where the forwarding database includes associations between (i) target ports and/or target packet processors 104 and (ii) addresses (e.g., MAC addresses, IP addresses, etc.). The forwarding engine is configured to maintain the forwarding database, in an embodiment. In other embodiments, the ingress processor 112 is configured to perform other suitable ingress processing functions in addition to or instead of making a forwarding decision. For example, in some embodiments, the ingress processor 112 is configured to analyze a descriptor to perform one or more of a tunnel termination function, assign a VLAN, perform an ingress policy control function, etc.

The ingress processor 112 provides the descriptor corresponding to the packet to the fabric 108 and informs the fabric of the target packet processor 104 to which the fabric 108 should send the descriptor. For example, an indicator of the target packet processor 104 is included in a field of the descriptor or appended to the descriptor. In another embodiment described below, the ingress processor 112 includes one or more descriptors in a frame in which a frame header indicates the target packet processor 104. The fabric 108 than directs the descriptor to the target packet processor 104.

The target packet processor 104 then performs egress processing associated with the descriptor. In various embodiments, egress processing includes one or more of egress traffic management (e.g., scheduling transmission of packets, traffic volume management, etc.) determining if packets should be dropped, performing flow control functions, measuring flow statistics, performing egress policing to ensure that traffic in a flow remains within terms of a service agreement, etc. As will be described in more detail below, the target packet processor 104 subsequently transmits, via the fabric 108, a prompt message (e.g., a PULL message), corresponding to a descriptor, to the packet processor 104 that generated the descriptor (the source packet processor 104). The source packet processor 104 receives the PULL message and processes the PULL message to determine the packet to which the PULL message corresponds. In an embodiment, the PULL message includes an identifier of the packet to which the PULL message corresponds, in an embodiment. The identifier of the packet is a pointer to, or some other suitable indicator of, the location in the packet memory 130 at which the packet is stored, in some embodiments. In an embodiment, a PULL message response manager 144 processes PULL messages to determine packets to which the PULL messages correspond. The PULL message response manager 144, after determining a packet to which a PULL message corresponds, retrieves the packet from the memory 130 and provides the packet to the fabric 108 and informs the fabric 108 of the target packet processor 104 to which the fabric 108 should provide the packet. For example, an indicator of the target packet processor 104 is included in a field of a frame header appended to the packet. The fabric 108 than directs the packet to the target packet processor 104.

Each egress processor 116 includes a respective set of one or more queues 154 for each port 120, and the egress processor 116 is configured to store descriptors received via the fabric 108 in the queues 154. In an embodiment, the egress processor 116 includes a set of multiple queues 154 for each port 120 of the packet processor 104, each queue 154 in a set corresponding to a different priority. The descriptor includes (i) an indication of the target port 120 and (ii) an indication of a priority/class of service of the packet to which the descriptor corresponds, and the egress processor 116 is configured to store the descriptor in the queue 154 that corresponds to the target port and the priority/class of service indicated by the descriptor, in an embodiment. Thus, each queue 154 corresponds to a respective target port/priority pair or target port/class of service pair, and the egress processor 116 is configured to assign the descriptor to the queue 154 that corresponds to the target port/priority pair or target port/class of service associated with the descriptor, in an embodiment. In some embodiments, the egress processor 116 has different quality of service (QoS) capabilities than the ingress processor 112 (e.g., different numbers of class of service queues). For example, in one embodiment, the egress processor 116 has a better QoS mechanism than the ingress processor 112 (e.g., the egress processor 116 has more queues corresponding to different classes of service as compared to queues in the ingress processor 112).

Additionally, each ingress processor 112 includes a respective scheduler 164 for each port 120 of the packet processor 104. Each scheduler 164 is configured to retrieve descriptors from the respective set of one or more queues 154 generally in an order in which corresponding packets are to be transmitted via the port 120 by the packet processor 104. When a descriptor is retrieved by the scheduler 164, the scheduler 164 generates a PULL message corresponding to the retrieved descriptor. In an embodiment, the egress processor 112 is configured to convert the retrieved descriptor to a PULL message. In another embodiment, the egress processor 112 is configured to use information from the retrieved descriptor to generate a PULL message, and to then discard the descriptor.

As discussed above, the PULL message includes an identifier of the packet to which the PULL message corresponds, in an embodiment. The scheduler retrieves the identifier of the packet from the retrieved descriptor and then includes the identifier in the PULL message, in an embodiment. After the PULL message is generated, the egress processor 116 provides PULL message to the fabric 108 and informs the fabric of the source packet processor 104 so that fabric 108 can direct the PULL message to the appropriate ingress processor. For example, an indicator of the source packet processor 104 is included in a field of the PULL message or appended to the PULL message. In an embodiment, the ingress processor 112 includes one or more PULL messages in a frame in which a frame header indicates the source packet processor 104. The fabric 108 than directs the PULL message to the source packet processor 104.

As discussed above, the source packet processor 104 subsequently provides to the fabric 108, in response to the PULL message, the packet corresponding to PULL message, and the fabric directs the packet to the target packet processor 104. The egress processor 116 includes a queue 158 for each port 120, and the egress processor 112 is configured to store packets received via the fabric 108 in the queues 158.

When the target packet processor 104 receives a packet, the egress processor 116 stores the packet in the queue 158 corresponding to the target port 120 via which the packet is to be transmitted. In an embodiment, an identifier of the target port 120 is included in, appended to, or otherwise associated with the packet, and the egress processor 116 utilizes the target port identifier to determine in which queue 158 to store the packet, in an embodiment. The egress processor 116 is configured to transmit packets in a queue 158 in an order in which the packets were stored in the queue, in an embodiment.

An example scenario will now be described to further illustrate operation of the network switch device 100. As indicated by the arrow 180, a packet is received at port 120a-5. The ingress processor 112a then stores the packet in the memory 130a, generates a descriptor, and determines that the packet is to be transmitted via a port of the packet processor 104b. In an embodiment, the ingress processor 112a also determines that the packet is to be transmitted via port 102b-2 of packet processor 104b.

As indicated by the arrow 184, the descriptor is provided to the fabric 108. As indicated by the arrow 186, the fabric 108 provides the descriptor to the packet processor 104b. The packet processor 104b stores the descriptor in an appropriate one of the queues 154b. The scheduler 164b subsequently generates a PULL message corresponding to the descriptor, and the egress processor 116b provides the PULL message to the fabric 108, as indicated by the arrow 188. The fabric 108 then provides the PULL message to the packet processor 104a, as indicated by the arrow 190.

In response to the PULL message, the ingress processor 112a retrieves the corresponding packet from the memory 130 and provides the packet to the fabric 108, as indicated by the arrow 192. The fabric 108 provides the packet to the packet processor 104b, as indicated by the arrow 194. The egress processor 116b stores the packet in the queue 158b corresponding to the port 120b-2. Subsequently, the packet processor 104b transmits the packet via port 120b-2, as indicated by the arrow 196.

As discussed above, each descriptor is smaller than the packet to which the descriptor corresponds. For example, in an embodiment, a descriptor has a length of at least 48 bits, and includes a packet identifier (20 bits), an indicator of a length of the packet (14 bits), an indicator of the target port (6 bits), and an indicator of a priority or class of service (3 bits). In another embodiment, the indicator of the target port, and the indicator of the priority or class of service comprises an egress queue number. In an embodiment, the egress queue number comprises an indicator of the target port, a customer identifier and/or VLAN identifier, and an indicator of the priority or class of service. In an embodiment, the ingress processor 112 includes one or more descriptors in a frame in which a frame header indicates the source packet processor 104 and the target processor 112 for all of the descriptors in the frame.

In some embodiments, descriptors generated by a source packet processor 104 to be provided to a target packet processor 104 are aggregated in a frame with other descriptors and/or other control messages. The descriptor frame includes a header having an indicator of the source packet processor and an indicator of the target packet processor, in an embodiment. The descriptor frame also includes a frame-type field and an error detection field such as a cyclic redundancy check (CRC) field.

Similarly, in some embodiment, PULL messages generated by a target packet processor 104 to be provided to a source packet processor 104 are aggregated in a frame with other PULL messages and/or other control messages. The PULL frame includes a header having an indicator of the source packet processor and an indicator of the target packet processor, in an embodiment.

Figure 2:
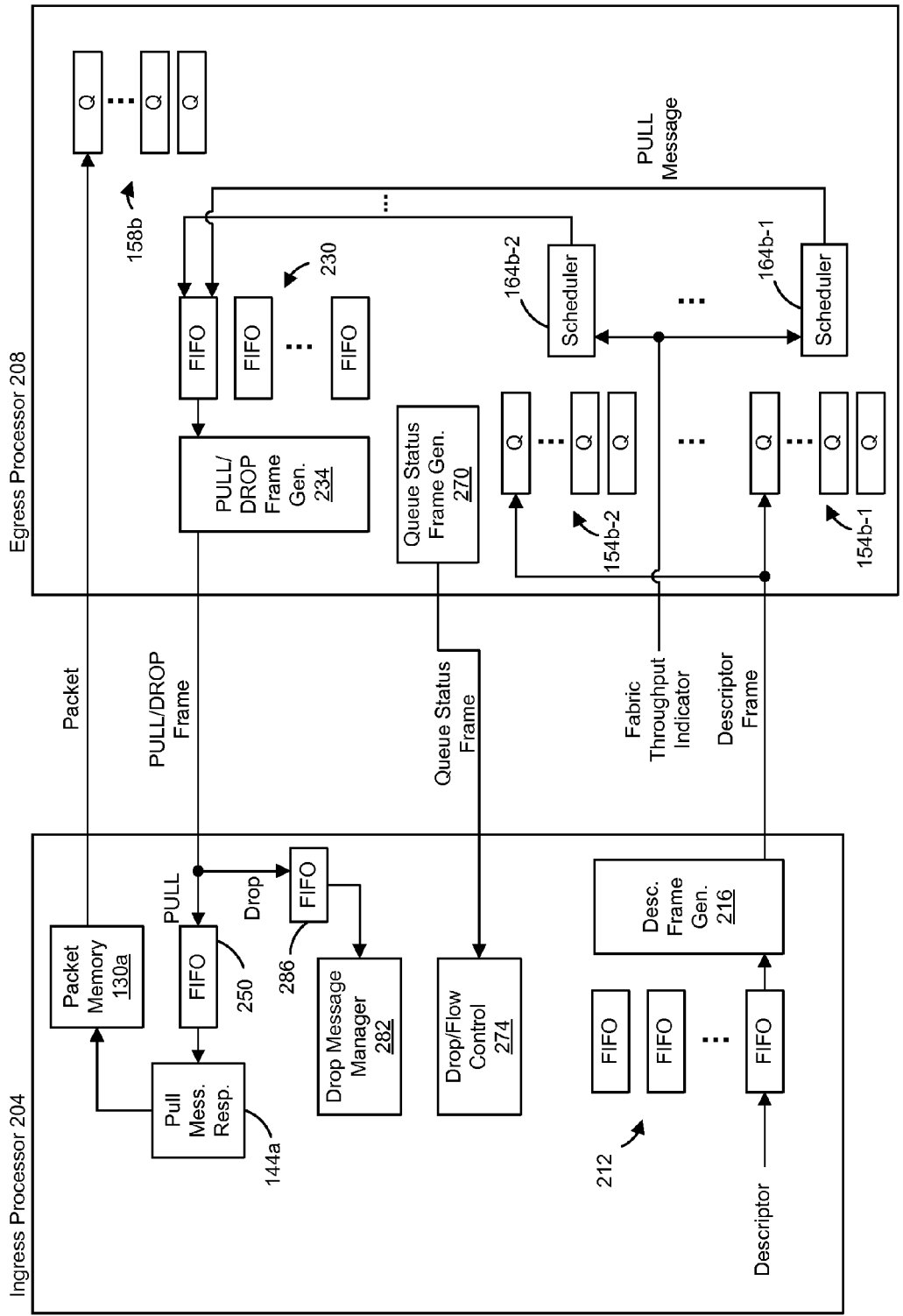
FIG. 2 is a block diagram of portions of another example network switch device, according to another embodiment.

FIG. 2 is a block diagram of portions of an example network device, according to an embodiment. In particular, FIG. 2 illustrates an example ingress processor 204 in communication with an example egress processor 208. The ingress processor 204 sends and receives data and control messages to/from the egress processor 208 via a fabric device (not shown in FIG. 2) in a manner similar to that described above with respect to the network device 100 of FIG. 1. The ingress processor 204 is included in a source packet processor (not shown in FIG. 2), and the egress processor 208 is included in a target packet processor (not shown). The fabric device, the source packet processor, the target packet processor, portions of the ingress processor 204, and portions of the egress processor 208 are not shown in FIG. 2 in order to improve clarity and to prevent obscuring operation of the ingress processor 204 and the egress processor 208.

In an embodiment, the ingress processor 204 of FIG. 2 is utilized as the ingress processor 112a of FIG. 1 and the egress processor 208 of FIG. 2 is utilized as the egress processor 116b of FIG. 1. For example, in an embodiment, each of a plurality of packet processors includes a respective ingress processor 204, and each of the plurality of packet processors includes a respective egress processor 208. Like numbered elements from FIG. 1 are not discussed in detail.

The ingress processor 204 is configured to perform ingress processing such as described above, and the egress processor 208 is configured to perform egress processing such as described above.

The ingress processor 212 includes a plurality of first-in-first-out buffers (FIFOs) 212, or queues, to store descriptors that are to be transmitted to target packet processors. In an embodiment, each FIFO 212 corresponds to a different target packet processor, and the ingress processor 204 is configured to store a descriptor in the FIFO 212 that corresponds to the target packet processor to which the descriptor is to be transmitted.

The ingress processor 204 also includes a descriptor frame generator 216 that is configured to generate descriptor frames, each descriptor frame including one or more descriptors or other control messages to be sent to a particular target packet processor. The descriptor frame generator 216 is configured to determine when a data in a particular FIFO 212 has exceeded a first threshold and, in response, retrieve descriptors from the FIFO 212 and generate a descriptor frame including the retrieved descriptors, according to an embodiment. The descriptor frame generator 216 is also configured to measure a time from when the descriptor frame generator 216 last retrieved descriptors from the FIFO 212, and compare the time to a second threshold, according to an embodiment. When the measured time exceeds the second threshold, the descriptor frame generator 216 is configured to, in response, retrieve descriptors from the FIFO 212 and generate a descriptor frame including the retrieved descriptors, according to an embodiment.

As discussed above, the descriptor frame, in an embodiment, includes a header having an indicator of the source packet processor and an indicator of the target packet processor, in an embodiment. The fabric 108 utilizes the target packet processor indicator to deliver the descriptor frame to the appropriate target packet processor.

The egress processor 208 is configured to receive the descriptor frame and to store descriptors within the descriptor frame to appropriate ones of the queues 154. As discussed above, the egress processor 208 includes a set of multiple queues 154 for each port 120 of the packet processor 104, in an embodiment. The egress processor 208 is configured to retrieve descriptors from the descriptor frame, and analyze, for each descriptor, (i) the indication of the target port, and (ii) the indication of the priority/class of service of the packet to which the descriptor corresponds. The egress processor 208 is configured to, for each descriptor in the descriptor frame, store the descriptor in the appropriate queue 154 that corresponds to the target port and the priority/class of service indicated by the descriptor, in an embodiment. The egress processor 208 is configured to associate with each descriptor stored in a queue 154 an indication of the source packet processor from which the descriptor was received, in an embodiment. For example, in an embodiment, the egress processor 208 associates the indicator of the source packet processor included in the descriptor frame header with each descriptor included in the descriptor frame.

As discussed above, each scheduler 164 is configured to retrieve descriptors from the respective set of one or more queues 154 generally in an order in which corresponding packets are to be transmitted via the port 120 by the packet processor 104. For example, the scheduler 164b-1 retrieves descriptors from the set of queues 154b-1 and the scheduler 164b-2 retrieves descriptors from the set of queues 154b-2. When a descriptor is retrieved from a queue 154b by the scheduler 164, the scheduler 164 generates a PULL message corresponding to the retrieved descriptor. In an embodiment, the scheduler 164 is configured to convert the retrieved descriptor to a PULL message. In another embodiment, the scheduler 164 is configured to use information from the retrieved descriptor to generate a PULL message, and to then discard the descriptor.

In an embodiment, each scheduler 164 is configured to monitor the fill levels of the transmit queues 158 and to throttle the rate at which scheduler 164 retrieves descriptors from queues 154 corresponding to congested transmit queues 158. Additionally, in an embodiment, each scheduler 164 is configured to monitor a throughput rate of the fabric 108 and to throttle the rate at which scheduler 164 retrieves descriptors from queues 154 responsive to the throughput rate of the fabric 108. In an embodiment, the schedulers 164 adapt the rates at which the schedulers 164 retrieve descriptors from the queues 154 according to throughput capabilities of the fabric 108. This is useful, for example, in case of a partial failure of the fabric, at least in some embodiments. In an embodiment, the fabric 108 is configured to measure the throughput of the fabric 108 and/or monitor throughput capabilities of the fabric 108, and to provide an indication of the throughput capabilities of the fabric 108 to the egress processors 208.

The egress processor 208 includes a plurality of FIFOs 230, where each FIFO 230 corresponds to a respective source packet processor. The schedulers 164 are configured to store each PULL message in a FIFO 230 corresponding to the source packet processor that generated the descriptor.

The egress processor 208 also includes a PULL/DROP frame generator 234 that is configured to generate PULL/DROP frames, each PULL/DROP frame including one or more PULL messages or other control messages (e.g., DROP messages) to be sent to a particular source packet processor. The PULL/DROP frame generator 234 is configured to determine when a data in a particular FIFO 230 has exceeded a third threshold and, in response, retrieve PULL messages from the FIFO 230 and generate a PULL/DROP frame including the retrieved PULL messages and/or DROP messages, according to an embodiment. The PULL/DROP frame generator 234 is also configured to measure a time from when the PULL/DROP frame generator 234 last retrieved control messages from the FIFO 230, and compare the time to a fourth threshold, according to an embodiment. When the measured time exceeds the fourth threshold, the PULL/DROP frame generator 234 is configured to, in response, retrieve control messages from the FIFO 230 and generate a PULL/DROP frame including the retrieved control messages, according to an embodiment.

As discussed above, the PULL/DROP frame, in an embodiment, includes a header having an indicator of the source packet processor and an indicator of the target packet processor, in an embodiment. The fabric 108 utilizes the source packet processor indicator to deliver the PULL/DROP frame to the appropriate source packet processor.

The ingress processor 204 is configured to receive PULL/DROP frames and to store control messages within PULL frames to a FIFO 250 and/or a FIFO 286 (e.g., PULL messages in FIFO 250 and DROP messages in FIFO 286). The ingress processor 204 is configured to associate with each control message stored in the FIFO 250 and the FIFO 286 an indication of the target packet processor from which the control message was received, in an embodiment. For example, in an embodiment, the ingress processor 204 associates the indicator of the target packet processor included in the PULL/DROP frame header with each control message included in the PULL frame.

The PULL message response manager 144 retrieves PULL messages from the FIFO 250 and processes PULL messages to determine packets to which the PULL messages correspond, as discussed above. The PULL message response manager 144 causes packets to be transmitted to target packet processors in response to PULL messages.

The egress processor 208 is configured to retrieve descriptors from the descriptor frame, and analyze, for each descriptor, (i) the indication of the target port, and (ii) the indication of the priority/class of service of the packet to which the descriptor corresponds. The egress processor 208 is configured to, for each descriptor in the descriptor frame, store the descriptor in the appropriate queue 154 that corresponds to the target port and the priority/class of service indicated by the descriptor, in an embodiment. The egress processor 208 is configured to associate with each descriptor stored in a queue 154 an indication of the source packet processor from which the descriptor was received, in an embodiment. For example, in an embodiment, the egress processor 208 associates the indicator of the source packet processor included in the descriptor frame header with each descriptor included in the descriptor frame.

In an embodiment, the egress processor 208 includes a queue status frame generator 270 configured to monitor the queues 154. Additionally, the queue status frame generator 270 is configured to generate queue status frames that include status information for queues 154. The status information indicates, for example, when a queue and/or a target port is congested, in an embodiment. Queue status frames generated by the queue status frame generator 270 are broadcast to all packet processors, in an embodiment. In an embodiment, at least some queue status frames generated by the queue status frame generator 270 are not broadcast, but rather are transmitted to specific packet processors, in an embodiment.

The ingress processor 204 includes a drop and/or flow control unit (drop/flow control unit) 274 that is configured to analyze queue status frames received from target processors. The drop/flow control unit 274 is configured to drop packets associated with a lossy service and that are destined for congested queues and/or ports of target processors. In an embodiment, the drop/flow control unit 274 is configured to perform flow control functions for packets associated with a lossless service. In some embodiments, the drop/flow control unit 274 is configured to perform Ethernet flow control functions such as defined in the IEEE 802.3x Standard, and/or priority-based flow control (PFC) functions such as defined in the IEEE 802.1Qbb Standard. As an example, when a queue status frame indicates a particular egress queue or queues 154 is/are congested, the drop/flow control unit 274 may transmit flow control messages (e.g., PAUSE messages) on one or more network ports 120a via which packets for the one or more egress queues 154 are being received to cause transmitting device(s) coupled to the one or more network ports 120a to stop transmitting packets for a time period. In an embodiment, the drop/flow control unit 274 is configured to monitor the packet memory 130 for congestion and to perform flow control for lossless services when the packet memory is congested.

Additionally, when the egress processor 208 determines that a packet should be dropped by the ingress processor 204, and such determination is made prior to transmission of a corresponding PULL message, the egress processor 208 is configured to transmit a drop message to the ingress processor 204 to prompt the ingress processor 204 to drop the packet from the memory 130. In one example scenario, upon receiving a descriptor, the egress processor 208 is unable to store the descriptor in a queue 154 and thus the egress processor 208 decides to drop the descriptor and thus that the ingress processor 204 should drop the corresponding packet. The egress processor 208 then transmits a DROP message to the ingress processor 204 to prompt the ingress processor 204 to drop the packet from the memory 130. As another example scenario, after receiving a descriptor, the egress processor 208 is unable to store the PULL message in the FIFO 230, and thus the egress processor 208 decides to drop the PULL message and thus that the ingress processor 204 should drop the corresponding packet. The egress processor 208 then transmits a DROP message to the ingress processor 204 to prompt the ingress processor 204 to drop the packet from the memory 130. In an embodiment, DROP messages are included in PULL/DROP frames.

In an embodiment, a drop message manager 282 of the ingress processor 112 is configured to process DROP messages and to discard packets in the memory 130 indicated by the drop messages. In an embodiment, drop messages are stored in the FIFO 286 coupled to the drop message manager 282.

In an embodiment, the egress processor 208 is configured to (i) analyze flow control messages received via network ports, and (ii) perform flow control functions for packets associated with a lossless service. In some embodiments, the egress processor 208 is configured to perform Ethernet flow control functions such as defined in the IEEE 802.3x Standard, and/or PFC functions such as defined in the IEEE 802.1Qbb Standard. As an example, when a PAUSE message is received via one of the network ports 120, the egress processor 208 may stop transmitting packets via the network port for a time period.

Additionally, in some embodiments, the egress processor 208 is configured to cause the schedulers 164b to stop, e.g., for a period of time, sending PULL messages associated with packets destined for the congested network ports via which a PAUSE message was received.

In an embodiment, the ingress processor 204 is configured to perform an aging process on packets stored in the memory 130. For example, in an embodiment, the ingress processor 204 is configured to determine when a packet has been stored in the memory 130 for at least a first time period during which no corresponding PULL message has been received, and to then delete the packet from the memory 130.

Similarly, in an embodiment, the egress processor 208 is configured to perform an aging process on descriptors stored in the queues 154. For example, in an embodiment, the egress processor 208 is configured to determine when a descriptor has been stored in a queue 154 for at least a second time period, and to then delete the descriptor from the queue 154. In an embodiment, the second time period is shorter than the first time period.

In some embodiments, the descriptor frame generator 216 and the PULL frame generator 234 of an ingress processor 204 and an egress processor 208 of a single packet processor 104 are implemented as a single control message frame generator. In some embodiments, descriptors, PULL messages, and drop messages generated by an ingress processor 204 and an egress processor 208 of a single packet processor 104 can be included in a single control message frame.

Figure 3:
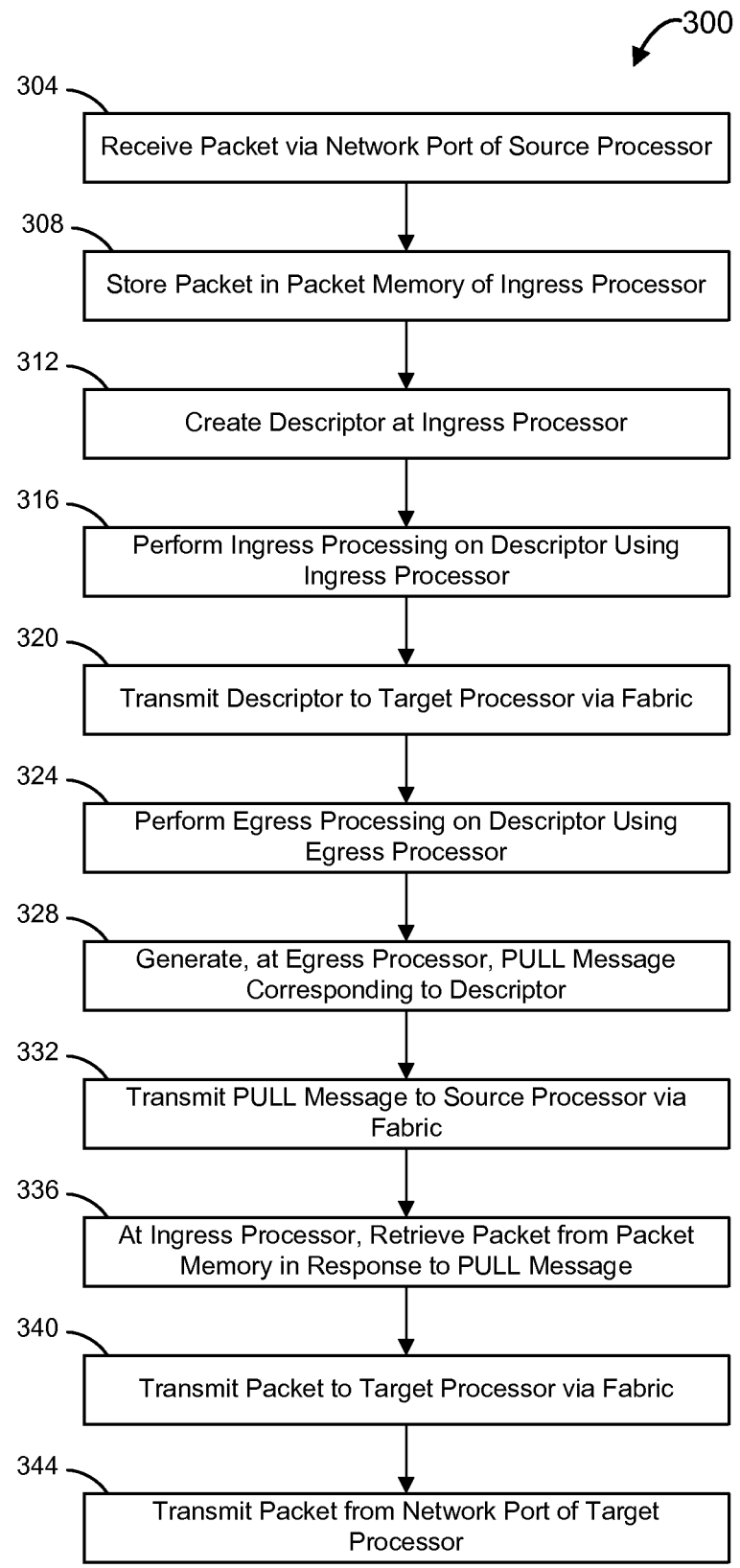
FIG. 3 is a flow diagram of an example method for managing internal traffic in a network switch, according to an embodiment.

FIG. 3 is a flow diagram of an example method 300 for managing internal traffic in a network switch having a plurality of ingress processors and egress processors coupled via a fabric device, according to an embodiment. The switch device 100 of FIG. 1 is configured to implement the method 300, in an embodiment. A switch device having a structure such as shown in FIG. 2 is configured to implement the method 300, in an embodiment. The method 300 is described with reference to FIGS. 1 and 2 for explanatory purposes. In other embodiments, however, the method 300 is implemented by another suitable switch device.

At block 304, a packet is received via a network port of a source packet processor of the switch device. For example, the packet is received via the network port 120a-5 of the source packet processor 104a, or via a network port associated with the ingress processor 204. At block 308, the ingress processor 112/204 stores the packet in the packet memory 130.

At block 312, the ingress processor 112/204 stores the packet in the packet memory 130 creates a descriptor corresponding to the packet. The descriptor is typically much smaller than the packet itself, in some embodiments and/or implementations.

At block 316, the ingress processor 112/204 performs ingress processing functions on the descriptor. In an embodiment, ingress processing includes making a forwarding decision such as determining a target network port via which the packet corresponding to the descriptor is to be transmitted and/or a target packet processor 104 that is to transmit the packet. In some embodiments, ingress processing includes analyzing the descriptor to perform one or more of a tunnel termination function, assign a VLAN, perform an ingress policy control function, etc.

At block 320, the source packet processor 104a transmits the descriptor to a target packet processor 104b via the fabric 108. In an embodiment, the descriptor is included in a control message frame with other control messages such as other descriptors, PULL messages, and/or drop messages. In an embodiment, the descriptor is included in a descriptor frame with other descriptors.

At block 324, the egress processor 116b/208 performs egress packet processing on the descriptor. In various embodiments, egress processing includes one or more of egress traffic management (e.g., scheduling transmission of packets, traffic volume management, etc.) determining if packets should be dropped, performing flow control functions, measuring flow statistics, performing egress policing to ensure that traffic in a flow remains within terms of a service agreement, etc.

At block 328, the egress processor 116b/208 generates a PULL message corresponding to the descriptor, the PULL message for prompting the ingress processor 112a/204 to retrieve the corresponding packet from the packet memory 130 and to transmit the packet, via the fabric 108, to the target packet processor 104b. At block 332, the target packet processor 104b transmits the PULL message to the source packet processor 104a via the fabric 108. In an embodiment, the PULL message is included in a control message frame with other control messages such as other PULL messages, descriptors, and/or drop messages. In an embodiment, the PULL message is included in a PULL frame with other PULL and/or drop messages.

At block 336, the ingress processor 112/204 retrieves from the packet memory 130 the packet corresponding to the PULL message in response to the PULL message. At block 340, the source packet processor 104a transmits the retrieved packet to the target packet processor 104b via the fabric 108. At block 344, the egress processor 116/208 causes the packet to be transmitted via a network port of the target packet processor.

Figure 4:
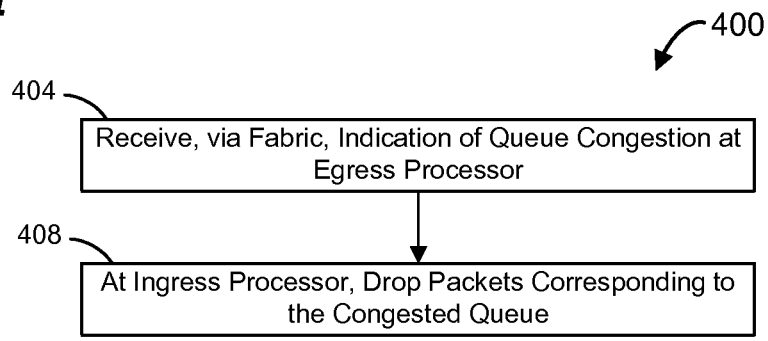
FIG. 4 is a flow diagram of another example method for managing internal traffic in a network switch in conjunction with a lossy service, according to another embodiment.

FIG. 4 is a flow diagram of an example method 400 for managing internal traffic in a network switch having a plurality of ingress processors and egress processors coupled via a fabric device, according to an embodiment. The switch device 100 of FIG. 1 is configured to implement the method 400, in an embodiment. A switch device having a structure such as shown in FIG. 2 is configured to implement the method 400, in an embodiment. The method 400 is described with reference to FIGS. 1 and 2 for explanatory purposes. In other embodiments, however, the method 400 is implemented by another suitable switch device. The method 400 is suitable for a lossy service, in an embodiment.

At block 404, the ingress processor 112a/204 receives, via the fabric 108, an indication of congestion at one or more of the queues 154 of an egress processor 116b/208. For example, the drop/flow control unit 274 receives a queue status frame from the egress processor 116b/208 that indicates one or more of the queues 154 are congested.

At block 408, the ingress processor 204 drops packets corresponding to the congested queue 154 for which descriptors have not yet been stored in the FIFOs 212, in an embodiment. For example, the drop/flow control unit 274 determines packets that correspond to the congested queue, and drops corresponding packets for which descriptors have not yet been stored in the FIFOs 212, in an embodiment.

Figure 5:
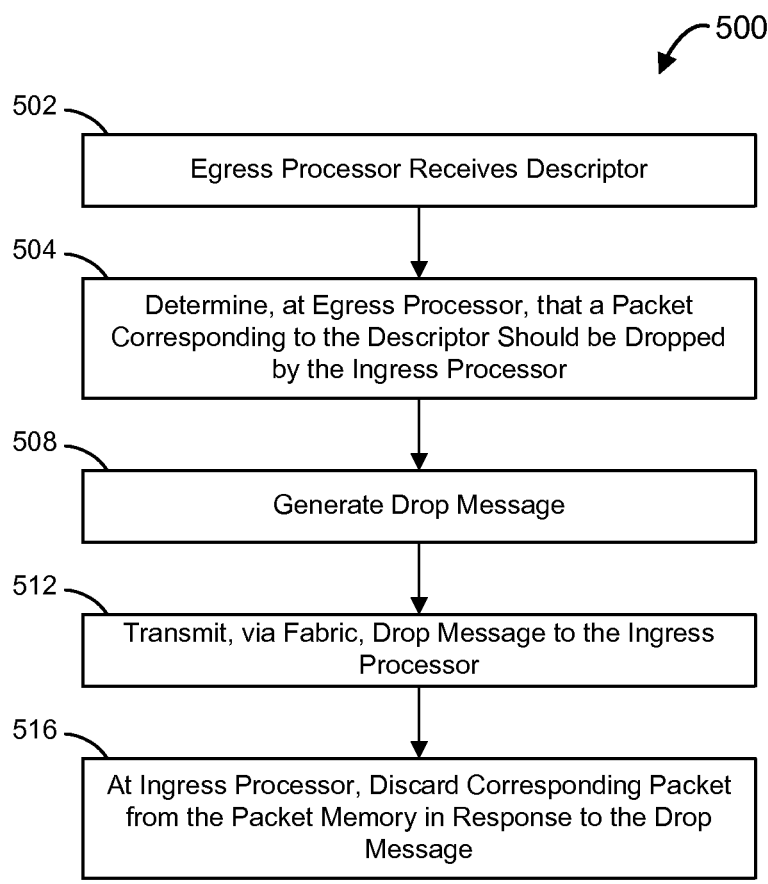
FIG. 5 is a flow diagram of another example method for managing internal traffic in a network switch in conjunction with a lossy service, according to another embodiment.

FIG. 5 is a flow diagram of an example method 500 for managing internal traffic in a network switch having a plurality of ingress processors and egress processors coupled via a fabric device, according to an embodiment. The switch device 100 of FIG. 1 is configured to implement the method 500, in an embodiment. A switch device having a structure such as shown in FIG. 2 is configured to implement the method 500, in an embodiment. The method 500 is described with reference to FIGS. 1 and 2 for explanatory purposes. In other embodiments, however, the method 500 is implemented by another suitable switch device. The method 500 is suitable for a lossy service, in an embodiment.

At block 502, the egress processor 116/208 receives a descriptor from one of the ingress processors 112/204 via the fabric 108.

At block 504, the egress processor 116/208 determines that the descriptor should be dropped, in an embodiment. Determining that the descriptor should be dropped implies that a packet corresponding to the received descriptor should be dropped by the ingress processor 116/208, in an embodiment. As an example, if a received descriptor cannot be properly enqueued in a queue 154, the egress processor 116/208 determines that the descriptor should be dropped, and thus the packet corresponding to the dropped descriptor should be dropped by the ingress processor 116/208, in an embodiment. As another example, if a PULL message cannot be properly enqueued in a FIFO 230, the egress processor 116/208 determines that the descriptor should be dropped, and thus the packet corresponding to the dropped descriptor should be dropped by the ingress processor 116/208, in an embodiment.

At block 508, the egress processor 116/208 generates a drop message corresponding to the packet that should be dropped. In an embodiment, the drop message is enqueued in an appropriate FIFO 230. At block 512, the egress processor 116/208 transmits the drop message via the fabric 108 to the appropriate source packet processor 104. In an embodiment, the drop message is included in a frame with one or more other control messages, such as one or more other drop messages or PULL messages. In an embodiment, generating the drop message comprises creating a drop message and discarding the descriptor. In another embodiment, generating the drop message comprises converting the descriptor to a drop message.

At block 516, the ingress processor 116/208 discards the packet from the packet memory 130, the packet corresponding to the drop message. The packet is discarded at block 516 in response to the ingress processor 116/208 receiving the drop message.

FIG. 6 is a flow diagram of an example method 600 for managing internal traffic in a network switch having a plurality of ingress processors and egress processors coupled via a fabric device, according to an embodiment. The switch device 100 of FIG. 1 is configured to implement the method 600, in an embodiment. A switch device having a structure such as shown in FIG. 2 is configured to implement the method 600, in an embodiment. The method 600 is described with reference to FIGS. 1 and 2 for explanatory purposes. In other embodiments, however, the method 600 is implemented by another suitable switch device. The method 600 is suitable for a lossless service, in an embodiment.

At block 604, the ingress processor 112a/204 receives, via the fabric 108, an indication of congestion at one or more of the queues 154 of an egress processor 116b/208. For example, the drop/flow control unit 274 receives a queue status frame from the egress processor 116b/208 that indicates one or more of the queues 154 are congested.

At block 608, the ingress processor 204 transmits one or more PAUSE messages on one or more network ports via which packets destined for the congested queue 154 are being received, in an embodiment. For example, the drop/flow control unit 274 determines network ports via which packets destined for the congested queue 154 are being received, and transmits one or more PAUSE messages via the one or more network ports, in an embodiment.

FIG. 7 is a flow diagram of an example method 700 for managing internal traffic in a network switch having a plurality of ingress processors and egress processors coupled via a fabric device, according to an embodiment. The switch device 100 of FIG. 1 is configured to implement the method 700, in an embodiment. A switch device having a structure such as shown in FIG. 2 is configured to implement the method 700, in an embodiment. The method 700 is described with reference to FIGS. 1 and 2 for explanatory purposes. In other embodiments, however, the method 600 is implemented by another suitable switch device. The method 700 is suitable for a lossless service, in an embodiment.

At block 704, the egress processor 208 receives a PAUSE message via a network port.

At block 708, the egress processor 208 causes a scheduler 164b corresponding to the network port via which the PAUSE message was received to stop, e.g., for a period of time, retrieving descriptors from one or more corresponding queues 154 and thus to stop generating PULL messages corresponding to such descriptors. For example, in an embodiment, the drop/flow control unit 290 is configured to cause the corresponding scheduler 164b to stop, e.g., for a period of time, retrieving descriptors from one or more corresponding queues 154 and thus to stop generating PULL messages corresponding to such descriptors.

At block 712, at least in some circumstances, congestion at the one or more queues 154 builds because the scheduler 164b stops retrieving descriptors from the one or more corresponding queues 154 as described above with respect to block 708. Thus, at least in some circumstances, the queue status frame generator 270 eventually transmits, via the fabric 108, indicators to ingress processors of congestion at the one or more queues 154. Thus, the method 600 of FIG. 6, or another suitable method, is invoked in response to congestion at the one or more queues 154.

Similarly, at block 716, at least in some circumstances, congestion at a packet memory 130 of an ingress processor 112/204 builds because the egress processor 116/208 stops transmitting PULL messages for descriptors in the one or more queues 154 as described above with respect to block 708.

At block 720, in response to congestion in the packet memory 130 (block 716) of the ingress processor 112/204, the ingress processor 112/204 transmits PAUSE messages on network ports coupled to the ingress processor 112/204.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a RAM, a ROM, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A network switch device, comprising:
a plurality of ingress processors, each ingress processor having (i) a plurality of ingress ports, and (ii) a packet memory to store packets received via the plurality of ingress ports;
a plurality of egress processors, each egress processor having a plurality of egress ports;
a switch fabric configured to communicatively couple the plurality of ingress processors to the plurality of egress processors;
wherein each ingress processor is configured to:
create descriptors for packets received via ingress ports, each descriptor having a smaller size than the corresponding packet,
store the packets in the packet memory,
process each descriptor to determine at least the appropriate egress processor among the egress processors to which to forward the descriptor,
transmit, via the switch fabric, descriptors to egress processors, and
in response to receiving PULL messages from the egress processors, transmit packets to the egress processors via the switch fabric.

2. The network switch device of claim 1, wherein each ingress processor comprises, for each egress processor, a corresponding buffer to store control messages to be sent to the egress processor, the control messages including descriptors;
wherein each ingress processor is configured to:
generate a frame to be sent to an egress processor, the frame comprising multiple control messages stored in the corresponding buffer, and
transmit the frame to the egress processor.

3. The network switch device of claim 1, wherein each ingress processor is configured to:
process drop messages received from egress processors, and
drop packets corresponding to the drop messages from the packet memory.

4. A method in a network switch device, the network switch device including a plurality of ingress processors communicatively coupled to a plurality of egress processors via a switch fabric, the method comprising:
receiving packets via ingress ports of the ingress processors;
storing packets received via ingress ports of the ingress processors in memories of the ingress processors;
creating descriptors for packets received via ingress ports of the ingress processors, each descriptor being having a smaller size than the corresponding packet;
processing, at the ingress processors, the descriptors to at least determine for each descriptor an appropriate egress processor among the plurality of egress processors to which to transmit the descriptor;
transmitting, via the switch fabric, descriptors from ingress processors to egress processors; and
responsive to PULL messages received from egress processors, transmitting, via the switch fabric, packets corresponding to the PULL messages from ingress processors to the egress processors.

5. The method of claim 4, further comprising:
generating, at an ingress processor, a frame to include at least multiple control messages destined for an egress processor, the control messages including at least one descriptor; and
transmitting, via the switch fabric, the frame from the ingress processor to the egress processor.

6. The method of claim 4, further comprising:
processing, at the ingress processors, drop messages received from egress processors; and
dropping packets corresponding to the drop messages from the memories of the ingress processors.

7. A network switch device, comprising:
an ingress processor having (i) a plurality of ingress ports, and (ii) a packet memory to store packets received via the plurality of ingress ports;
an egress processor having a plurality of egress ports;
a switch fabric configured to communicatively couple the ingress processor to the egress processor;
wherein the ingress processor is configured to:
create descriptors for packets received via ingress ports, each descriptor having a smaller size than the corresponding packet,
process the descriptors while the packets are stored in a memory associated with the ingress processor, and
in response to receiving PULL messages from the egress processor, retrieve corresponding packets from the memory and transmit the retrieved packets to the egress processors via the switch fabric.

8. The network switch device of claim 7, wherein the ingress processor comprises a buffer to store control messages to be sent to the egress processor, the control messages including descriptors;
    wherein the ingress processor is configured to:
        generate a frame to be sent to the egress processor, the frame comprising multiple control messages stored in the corresponding buffer, and
        transmit the frame to the egress processor.

9. The network switch device of claim 7, wherein the ingress processor is configured to:
    receive drop messages from the egress processor,
    process the drop messages, and
    drop packets corresponding to the drop messages from the packet memory.

10. A method for managing internal traffic in switch having ingress processors and egress processors, the ingress and egress processors coupled by a switch fabric, the method comprising:
    receiving packets via ingress ports of an ingress processor;
    storing packets received via ingress ports of the ingress processor in a memory of the ingress processor;
    creating descriptors for packets received via ingress ports of the ingress processor, each descriptor being having a smaller size than the corresponding packet;
    processing, at the ingress processor, the descriptors while corresponding received packets are stored in the memory; and
    responsive to PULL messages received from an egress processor, transmitting, via a switch fabric, packets from the ingress processor to the egress processor.

11. The method of claim 10, further comprising:
    generating, at the ingress processor, a frame to include multiple control messages destined for the egress processor, the control messages including at least one descriptor; and
    transmitting, via the switch fabric, the frame from the ingress processor to the egress processor.

12. The method of claim 10, further comprising:
    processing, at the ingress processor, drop messages received from the egress processor; and
    dropping packets corresponding to the drop messages from the memory of the ingress processor.

13. A network switch device, comprising:
    a plurality of ingress processors, each ingress processor having a plurality of ingress ports;
    a plurality of egress processors, each egress processor having (i) a plurality of egress ports, and (ii) a plurality of egress queues corresponding to the plurality of egress ports;
    a switch fabric to communicatively couple the plurality of ingress processors to the plurality of egress processors;
    wherein each egress processor is configured to:
        receive, from ingress processors, descriptors corresponding to packets received by the ingress processors via the switch fabric, each descriptor having a smaller size than the corresponding packet,
        save descriptors in queues corresponding to egress ports via which packets corresponding to the descriptors are to be transmitted,
        perform an egress processing operation on descriptors stored in the queues,
        send, to ingress processors via the switch fabric, PULL messages corresponding descriptors stored in the queues, the PULL messages to prompt the ingress processors to transmit, via the switch fabric, corresponding packets,
        receive, via the switch fabric, packets from ingress processors responsive to the PULL messages, and
        transmit, via egress ports, packets received from ingress processors via the switch fabric.

14. The network switch device of claim 13, wherein each of at least some of the egress processors are configured to, if the egress processor determines that a packet should be dropped prior to transmitting a PULL message corresponding to the packet, transmit a drop message to the ingress processor to prompt the ingress processor to drop the packet from the memory of the ingress processor.

15. The network switch device of claim 13, wherein each egress processor comprises a corresponding buffer, for each ingress processor, to store control messages to be sent to the ingress processor, the control messages including PULL messages;
    wherein each egress processor is configured to:
        generate a frame to be sent to an ingress processor, the frame comprising multiple control messages stored in the corresponding buffer, and
        transmit the frame to the ingress processor.

16. The network switch device of claim 13, wherein each egress processor is configured to perform, on descriptors, an egress processing operation including one or more of (i) egress traffic management, (ii) performing a flow control function, (iii) measuring flow statistics, and (iv) performing egress policing.

17. A method in a network switch device, the network switch device including a plurality of ingress processors communicatively coupled to a plurality of egress processors via a switch fabric, the method comprising:
    receiving, at egress processors, descriptors from ingress processors via the switch fabric, the descriptors corresponding to packets received by the ingress processors, each descriptor being having a smaller size than the corresponding packet;
    responsive to descriptors, transmitting, via the switch fabric, PULL messages from egress processors to ingress processors, the PULL messages prompting ingress processors to transmit packets stored in memories of ingress processors;
    receiving, at egress processors, packets from ingress processors, the packets being transmitted in response to PULL messages; and
    transmitting, via egress ports of egress processors, packets received from ingress processors via the switch fabric.

18. The method of claim 17, further comprising:
    determining, at an egress processor, that a packet should be dropped, wherein determining that the packet should be dropped is performed prior to the egress processor transmitting a PULL message corresponding to the packet; and
    transmitting, via the switch fabric, a drop message from the egress processor to the ingress processor to prompt the ingress processor to drop the packet from the memory of the ingress processor.

19. The method of claim 17, further comprising:
    generating, at an egress processor, a frame to include multiple control messages destined for an ingress processor, the control messages including at least one PULL message; and
    transmitting, via the switch fabric, the frame from the egress processor to the ingress processor.

20. The method of claim 17, further comprising performing, on descriptors received from ingress processors, egress processing operations including one or more of (i) egress traffic management, (ii) a flow control function, (iii) measuring flow statistics, and (iv) performing egress policing.

* * * * *